Patented June 13, 1933

1,914,312

UNITED STATES PATENT OFFICE

KARL VIEWEG, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

PROCESS FOR THE MANUFACTURE OF COMPOSITIONS OF HYDROGEN-PEROXIDE-PHOSPHATE

No Drawing. Application filed August 14, 1930, Serial No. 475,392, and in Germany August 18, 1928.

Applications have been filed in Germany, Aug. 18, 1928, (D 56,407); and Austria, Aug. 18, 1928, (A 5509-28) and Aug. 3, 1929, (A 5557-29).

It is well known that compositions of hydrogen-peroxide-phosphate may be produced by reciprocal action between phosphoric acid salts and hydrogen peroxide. For instance, dialkaliphosphate or alkalipyrophosphate is mixed with 30% hydrogen peroxide and the diluted mixture freed of the remaining hydrogen peroxide by heating in vacuo at low temperatures (see German Patent 287,588). The examples of this patent prescribe a considerable excess of hydrogen peroxide, i. e. 4-6 molecules of hydrogen peroxide to 1 molecule of phosphate. This process gives but comparatively low yields of oxygen (see German Patent 293,786). According to the German Patent 293,786 the results are far better if 1 molecule of sodiumpyrophosphate is mixed with 3 molecules of hydrogen-peroxide, the solution then quickly evaporated in vacuo, whereby products with content of oxygen of about 27% hydrogen peroxide are obtained. Studying these processes I have found the disadvantage that all these products are not stable but decompose in a very short time especially at higher temperatures.

Now I have found that stable compositions of hydrogenperoxide-phosphate may be obtained in such a way that the products which result, for instance, by reciprocal action between sodiumpyrophosphate and hydrogen peroxide and following evaporation are subjected to a total dehydration. This may be carried out in such a way that the products obtained after the known evaporation processes are further heated, for instance in vacuo, this heating then continued up to the total or practically total dehydration. It is advisable to pulverize the agglomerated dried product and to dehydrate this pulverulent material once more. Working on a large scale involves a continuous mixing of the material, for instance, in rotating tubes, stirring apparatus and the like in order to avoid agglomeration during the evaporation or drying process.

Further investigations have shown that compounds of fixed compositions are distinguished by special stability. Those compounds contain, for instance, 1 molecule of alkalipyrophosphate to about 2 molecules of hydrogen peroxide or 1 molecule of dialkaliphosphate to about 1 molecule of hydrogen peroxide. The manufacture of these products may be carried out in a very simple way by mixing the initial substances in the above mentioned proportions, removing the largest part of water, for instance, in vacuo and continuing the dehydration process until an anhydrous product results.

Example 223 g $Na_4P_2O_7.10H_2O$ are mixed with 110 cc of 30.9% hydrogen peroxide; the resulting paste is evaporated in vacuo at about 30° centigrade. On completion of the evaporation the agglomerated mass is crushed, pulverized and then heated again, whereby once more about 10-20 grs of water are given off but no agglomeration occurs. The very small quantity of hydrogen peroxide which passes over in the distillation process may be used again, for instance, in such a way that the freshly applied pyrophosphate is mixed with the distillate containing hydrogen peroxide, the mixture then evaporated again mixed with fresh hydrogen peroxide and then treated with fresh hydrogen peroxide as mentioned above. The yields are 95% and more of the hydrogen peroxide applied, obtaining compositions which are distinguished by extreme stability even at high temperatures. A product with an initial value of 19.65% $H_2O_2$ still had 19.58% $H_2O_2$ after 150 days storing at ordinary temperature, there had practically been no change of the content of oxygen.

The superiority of my process compared with the hitherto known processes, for instance, with German Patent 293,786, will be shown by the following example:

A salt which was manufactured in accordance to Example 1 of German Patent 293,786 (a substance dried over sulfuric acid during about 10 hours standing in vacuo) and which had 11.1% of active oxygen had only 92% of the initial value of active oxygen after a period of 125 days.

A salt prepared according to my invention which had an initial value of active oxygen of 9% showed after a period of 447 days still 98.9% of the initial value of active oxygen.

The manufacture of stable hydrogenperoxide-disodiumphosphate compounds may be carried out by the action of 1 molecule phosphate upon 1 molecule of hydrogen peroxide analogous to the above mentioned examples.

The same good results will be obtained if larger quantities of hydrogen peroxide are used. For instance 2.5 or 3 molecules hydrogen peroxide to 1 molecule sodium-pyrophosphate or 2 molecules or even more of hydrogen peroxide to 1 molecule dialkaliphosphate may be used and nevertheless stable products obtained if these products are totally or practically totally dehydrated after evaporation of the remaining hydrogenperoxide. During the dehydration process the less stable compositions formed first, of higher content of hydrogenperoxide are converted into the stable forms (s. above), for instance, those containing 1 molecule pyrophosphate to 2 molecules of $H_2O_2$ or 2 molecules of disodiumphosphate to 2 molecules of $H_2O_2$. These stable compounds are not affected by a drying process which goes beyond the limits of the total dehydration or by use of higher drying temperatures. If these products are partly decomposed they are only a little poorer in oxygen but as stable as the other products. The hydrogen peroxide which passes over during the heating—working with hydrogen peroxide in excess—may be again employed in the process for instance in such a way that the distillate containing hydrogen peroxide or a concentration product of same is mixed with fresh phosphate; the mixture then evaporated, fresh hydrogen peroxide added again and so on.

I have also found that I can work with no excess of hydrogen peroxide, even less than 2 molecules of $H_2O_2$ to 1 molecule of pyrophosphate or 2 molecules of disodiumphosphate respectively, if care is taken to totally dehydrate the evaporation products.

The process may be carried out with crystalline or anhydrous phosphates or mixtures thereof. The hydrogen peroxide may be used in the commercial 30% concentration or in higher concentration. In general it is advantageous to work with a low water content.

Instead of the phosphates mentioned above my invention may also be carried out with the corresponding acids or acid salts if these are brought into reaction with corresponding quantities of alkaliperoxide.

What I claim is:

1. A process for the manufacture of compositions of hydrogen peroxide-phosphates comprising the steps of evaporating a mixture of a phosphate and hydrogen peroxide to dryness, pulverizing the resulting product, and then dehydrating the pulverized product by heating in vacuo until a stable product results.

2. A process for the manufacture of compositions of hydrogen peroxide-phosphates comprising the steps of evaporating to dryness a mixture of a phosphate and hydrogen peroxide in a partial vacuum, pulverizing the resulting product, and then dehydrating the pulverized product by heating in a partial vacuum until a stable product results.

3. A process for the manufacture of compositions of hydrogen peroxide-phosphates comprising the steps of evaporating to dryness a mixture of disodium phosphate and hydrogen peroxide, substantially in the proportions of two molecules of disodium phosphate to two molecules of hydrogen peroxide, pulverizing the resulting product, and then heating the product in a partial vacuum until a stable product results.

4. A process for the manufacture of compositions of hydrogen peroxide-phosphates comprising the steps of evaporating to dryness a mixture of a pyrophosphate and hydrogen peroxide substantially in proportions of one molecule of the pyrophosphate to two molecules of hydrogen peroxide, pulverizing the resulting product, and then heating the product in vacuo until a stable product results.

5. A process for the manufacture of compositions of hydrogen peroxide-phosphates by evaporating a mixture of a phosphate and hydrogen peroxide in a partial vacuum, pulverizing the resulting product, and then removing the excess quantities of hydrogen peroxide and dehydrating the product by heating in a partial vacuum until a stable product of the desired composition is obtained.

6. A process for the manufacture of compositions of hydrogen peroxide-phosphates comprising the steps of evaporating to dryness a mixture consisting of an alkali peroxide and a compound selected from the group which consists of phosphoric acids and acid salts of phosphoric acids, pulverizing the resulting product, and then dehydrating the pulverized material by heating in a partial vacuum until a stable product results.

Signed at Brussels, in the Province of Brabant and Kingdom of Belgium this 26th day of July A. D. 1930.

KARL VIEWEG.